(12) United States Patent
Bellamy et al.

(10) Patent No.: US 8,825,561 B2
(45) Date of Patent: Sep. 2, 2014

(54) METHOD AND SYSTEM OF DETERMINING A PRIORITIZED LIST OF USERS RELATED TO A GIVEN GOAL

(75) Inventors: Rachel K. E. Bellamy, Hawthorne, NY (US); Margaret M. Burnett, Corvallis, OR (US); Joseph A. Lawrance, Braintree, MA (US); Peter K. Malkin, Hawthorne, NY (US); John T. Richards, Hawthorne, NY (US); Clay E. Williams, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 12/538,419

(22) Filed: Aug. 10, 2009

(65) Prior Publication Data

US 2011/0035343 A1 Feb. 10, 2011

(51) Int. Cl.
*G06F 17/00* (2006.01)
*G06F 17/20* (2006.01)
*G06N 5/04* (2006.01)
*G06N 99/00* (2010.01)
*G09B 7/04* (2006.01)

(52) U.S. Cl.
CPC ............ *G06F 17/00* (2013.01); *G06F 17/20* (2013.01); *G06N 5/04* (2013.01); *G06N 99/005* (2013.01); *G09B 7/04* (2013.01)
USPC ........................................... 706/11

(58) Field of Classification Search
CPC ......... G09B 7/04; G06F 9/4446; G06F 17/00; G06F 17/20; G06N 5/02; G06N 99/005; G06N 5/04

USPC ................................. 706/11, 45, 62
See application file for complete search history.

(56) References Cited

U.S. PATENT DOCUMENTS

| 6,701,519 | B1 * | 3/2004 | Cowan | 717/130 |
| 7,243,337 | B1 * | 7/2007 | Cowan | 717/127 |
| 7,392,510 | B1 * | 6/2008 | Treder et al. | 717/128 |
| 2007/0150482 | A1 * | 6/2007 | Taylor et al. | 707/10 |

OTHER PUBLICATIONS

Singer et al, "NavTracks: Supporting Navigation in Software", Proceedings of the 13th International Workshop on Program Comprehension (IWPC'05), on pp. 173-175, Date of Conference : May 15-16, 2005.*

McDonald et al, "Expertise Recommender: A Flexible Recommendation System and Architecture", CSCW'00, Dec. 2-6, 2000, Philadelphia, PA.*

(Continued)

*Primary Examiner* — Jeffrey A Gaffin
*Assistant Examiner* — Ilya Traktovenko
(74) *Attorney, Agent, or Firm* — Scully, Scott, Murphy & Presser, P.C.

(57) ABSTRACT

A method and system of determining a prioritized list of one or more users related to a given goal obtaining a set of places, determine one or more future places an expert associated with a given goal is predicted to visit to accomplish the given goal, obtain a history of one or more places users have visited, determine one or more historical places from the history of one or more places that match the future places, and identify one or more users associated with the determined one or more historical places.

23 Claims, 3 Drawing Sheets

(56) References Cited

OTHER PUBLICATIONS

Ko et al, "An Exploratory Study of How Developers Seek, Relate, and Collect Relevant Information during Software Maintenance Tasks", IEEE Transactions on Software Engineering, vol. 32, No. 12, Dec. 2006.*

Roussinov, "Information Foraging Through Clustering and Summarization: A Self-Organizing Approach", The University of Arizona, 1999.*

Chi et al, "The Scent of a Site: A System for Analyzing and Predicting Information Scent, Usage, and Usability of a Web Site", CHI '2000 The Hague, Amsterdam, Apr. 1-6, 2000.*

Wexelblat et al, "Footprints: History-Rich Tools for Information Foraging", CHI 99, Pittsburgh PA USA, May 15-20, 1999.*

Chi et al, "Using Information Scent to Model User Information Needs and Actions on the Web", SIGCHI'01, Mar. 31-Apr. 4, 2001, Seattle, WA, USA.*

Chakrabarti et al, "Automatic Resource Compilation by Analyzing Hyperlink Structure and Associated Text", Computer Networks and ISDN Systems 30 (1998) 65-74, Proc. of the 7th International World Wide Web Conference (WWW7), Brisbane, Australia.*

Silva et al, "Link-based and Content-based Evidential Information in a Belief Network Model", Best Student Paper in SIGIR '2000, presented on Oct. 11, 2000, Proc. of the 21st ACM SIGIR Conference on Research and Development in Information Retrieval (pp. 96-103), Athens, Greece.*

Chi et al., Using Information Scent to Model User Information Needs and Actions on the Web, in Proc. CHI 2001, ACM Press (2001), http://www-users.cs.umn.edu/~echi/papers/chi2001/2001-04-scent-algo-final.pdf.

Deline et al, Easing Program Comprehension by Sharing Navigation Data, 2005 IEEE Symposium on Visual Languages and Human-Centric Computing, pp. 241-248, http://citeseerx.ist.psu.edu/viewdoc/download?doi=10.1.1.90.8373&rep=rep1&type=pdf.

Lawrance, Joseph et. al., Using Information Scent to Model the Dynamic Foraging Behavior of Programmers in Maintenance Tasks, CHI, Apr. 5-10, 2008, Florence, Italy.

* cited by examiner

METHOD AND SYSTEM OF DETERMINING A PRIORITIZED LIST OF USERS RELATED TO A GIVEN GOAL

BACKGROUND

The present disclosure generally relates to computer system programming, predictive models and language compilers, interpreters and tools, and more particularly to determining a prioritized list of users related to a given goal.

Information foraging theory is based on optimal foraging theory, a theory of how predators and prey behave in the wild. In the domain of information technology, the predator is the person in need of information and the prey is the information itself. Using concepts such as "patch," "diet" and "scent," information foraging theory describes the most likely pages (patches) a web-site user will visit in pursuit of their information need (prey), fore example, by clicking links containing words that are a close match to (smell like) their information need. The scent of information comes from the linguistic relationships between words expressing an information need and words contained in links to web pages.

The present disclosure builds on the concept of information foraging to determine and recommend persons for accomplishing a given goal.

BRIEF SUMMARY OF THE INVENTION

A method and system for determining a prioritized list of one or more users related to a given goal are provided. In one aspect, the method may include obtaining a set of places, and determining one or more future places an expert associated with a given goal is predicted to visit to accomplish the given goal. The method may also include obtaining a history of one or more places users have visited, and determining one or more historical places from the history of one or more places that match the future places. The method may further include identifying one or more users associated with the determined one or more historical places.

A system for determining a prioritized list of one or more users related to a given goal, in one aspect, may include a historical model including at least history of one or more places users have visited. The system may also include a predictive model including one or more future places an expert associated with a given goal is determined to visit to accomplish the given goal. The system may further include a matching module operable to execute on a processor and to determine one or more historical places from the history of one or more places that match the future places. The matching module may be further operable to identify one or more users associated with the determined one or more historical places. The system may further include a user interface module operable to present the identified one or more users.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

When people are programming, they navigate to different places, for example, methods or procedures, classes, lines in the source code. It is possible to record the places they visited during this code navigation. This record provides an historical set of data about places programmers have navigated to. This historical data log can also include the order in which the places are visited, in other words, the paths programmers take through the source code.

Human behavioral models, for example, information foraging models, predict the places in the source code to which an expert programmer would be most likely navigate given a particular goal, for example, a bug they need to fix or a feature they need to add. Furthermore, this set of places can include the order in which the places will be visited, that is, the predicted path.

Given the set of places programmers have visited in the past, and the set of places they are most likely to visit in the future, a system and method of the present disclosure match those two sets to produce a list of the people who have previously visited the places that the human behavioral model is predicting an expert programmer is most likely to visit given the current goal. Using the predicted navigation path data for accomplishing the goal, the system and method of the present disclosure can match future and historical paths to find people who have previously traversed the predicted path or a subset of the path traversal.

Figure 1:
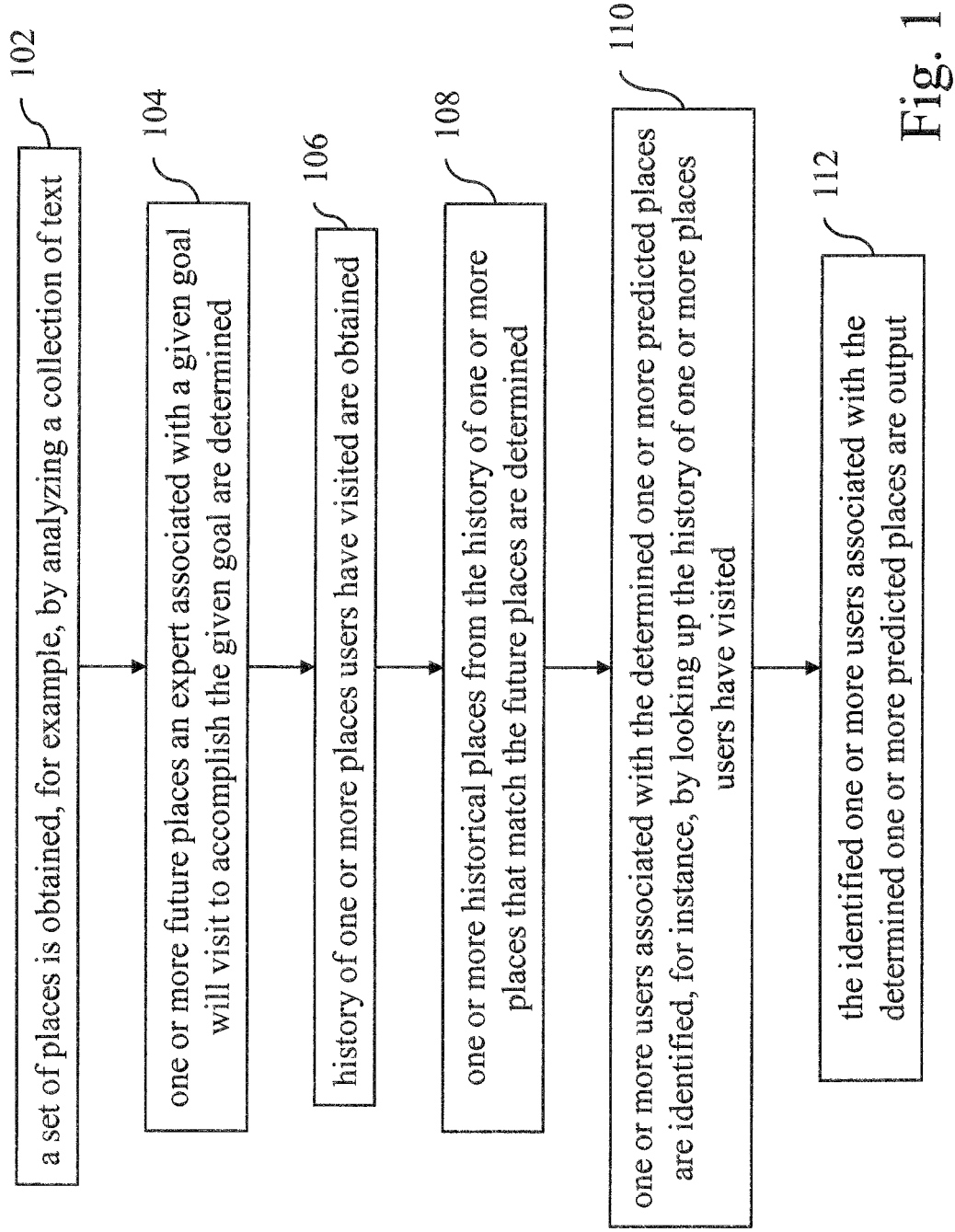
FIG. 1 is an architectural diagram illustrating a system of the present disclosure in one embodiment.

FIG. 1 is a flow diagram illustrating the method of the present disclosure in one embodiment. At 102, a set of places is obtained, for example, by analyzing a collection of text. The collection of text may be a source code, system or software requirements, and documentation. The set of places may include one or more locations in the text, such as line numbers, method names, class declaration, etc. in the source code. As one skilled in the art would understand, this can be achieved, for instance, through static analysis, or static code analysis of the text such as the source code; it can also be achieved using dynamic analysis at run-time given appropriate logging. Any other methodologies may be used.

At 104, the method may include determining one or more future places that an expert or the like with a given goal will likely visit to accomplish that given goal. A given goal may be, for example, fixing a computer system bug, which may be described in a bug report, and/or another goal that may be described in a bug report. A predictive model which will be described below in more detail may be used to predict the one or more future places, for instance, that a programmer knowledgeable about the bug is likely to visit in order to fix that bug.

At 106, histories of one or more places users have visited are obtained. This provides a list of the paths traversed by each user, as well as frequencies of visits to different locations for each user. For instance, for each programmer or the like person who debugs or programs, a set of places that person visits may be logged and kept as a historical record of places the person has visited in the past. Storage and use of such historical navigation data are described, for example, in R. Deline, M. Czerwinski, G. Robertson, 2005 IEEE Symposium on Visual Languages and Human-Centric Computing, pp. 241-248. The history of one or more places users have visited may also include secondary information associated with the users such as the user's role or job position and/or others. Although not associated with navigation history, an example of a tool that allows definition of user roles which can then be associated with particular users is Rational Team Concert.

At 108, one or more historical places from the history of one or more places that match the future places are determined. For instance, the historical paths are compared against the predicted path, to create a ranked list of the historical paths that best match the predicted path. A list matching algorithm such as Smith-Waterman algorithm may be utilized to perform this type of matching. This algorithm may simply match individual places on the path, or do a more complex matching where sub-paths are matched. Other algorithms may be utilized and the present disclosure does not limit the algorithms to perform the matching. In one aspect, all users associated with the matched one or more historical places may be identified. In another aspect, the frequency in which the matched one or more historical places have been visited may be also determined. Further, the total number of times the matched one or more historical places have been visited may be also determined.

At 110, one or more users associated with the historical paths that best match the predicted path are identified. At this, or the preceding step, different users may be selected based on additional user characteristics such as 'role' or 'project'. For example, the search could be constrained to only those users who work on a particular project.

At 112, the identified one or more users associated with the determined one or more historical places are output. A user interface, for example, may present this information, to recommend the likely or best fit users who can accomplish the given goal. This information may be presented in any one or more of the following ways. For example, a user interface may present this information, to recommend the likely or best fit users who can advise on a given goal. The user interface can present these recommendations as an ordered list. The user interface can present these recommendations within the context of the source code itself, for example, as annotations when displayed or otherwise presented in an interactive development environment. In one embodiment, the users could type in a goal and the system may output an ordered list containing the predicted places a user should navigate to in order to achieve the desired goal (i.e., a predicted navigation path), and/or a list of users who have previously traversed some, or all of this path, for example, ordered according to best match to the predicted path. Selecting a user may highlight the path that user has previously visited. Selecting a location in the predicted path, may highlight those users who have previously visited this place. Further interactions and styling may provide more information on the exact nature of the historical navigation data for a user. Such a user interface may be implemented within the Eclipse framework. The present disclosure, however, does not limit the implementation environment, thus any other implementation environment or methodologies may be utilized.

Figure 2:
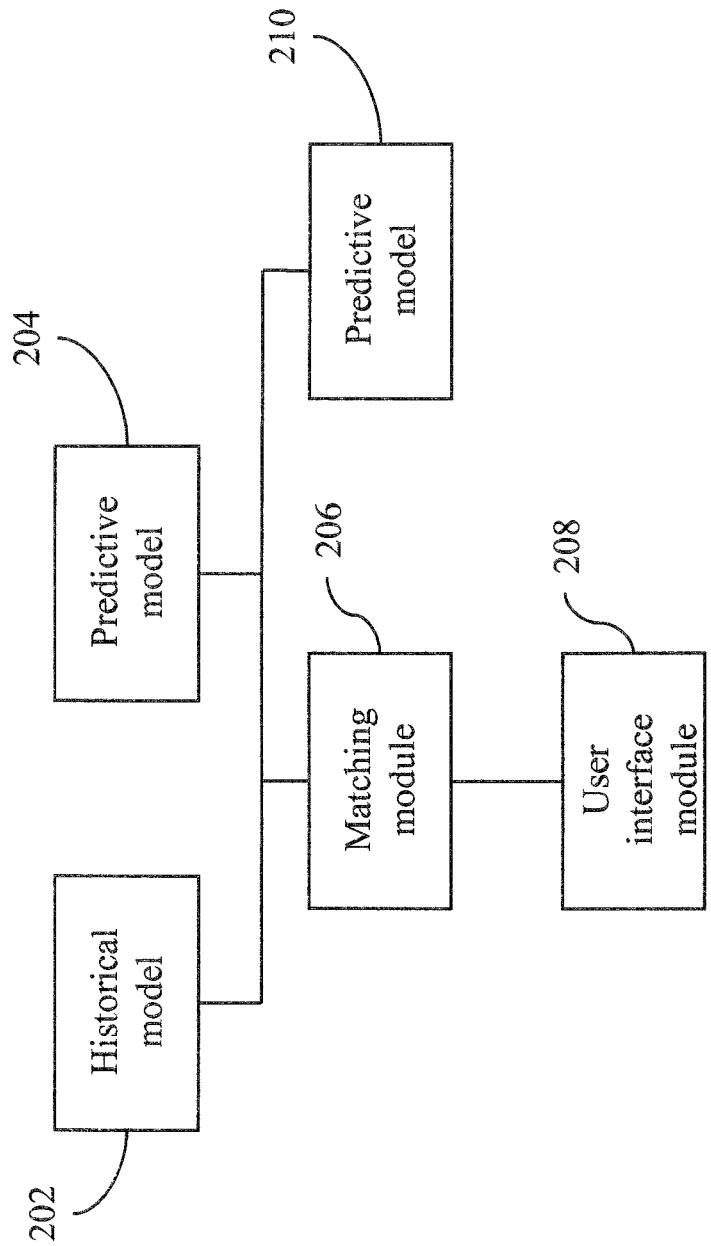
FIG. 2 is a flow diagram illustrating a method of predictive model of the present disclosure in one embodiment.

FIG. 2 is an architectural diagram illustrating a system of the present disclosure in one embodiment. A historical model 202 includes programmers and places in the source code (e.g., methods, classes, lines, libraries, and others) that those programmers have visited in the past or likely to visit in the future. For instance, the historical model may include a plurality of programmer identifiers. For each programmer identifier, a list of places in the source code or the like or other text or documents may be associated. A programmer identifier may be associated with multiple source codes. The historical model may be built as an extension to an integrated development environment (IDE) using Java or other programming language. It may also be a stand-alone module to which an IDE sends logging information. It may capture and store logging events. In another embodiment, the historical module may be implemented as a combined local Java module running within an IDE to log events and a server-side web service to which logged events are sent from multiple local IDEs. The service may capture and store the logged events. The service can be coded in any language that allows coding of web services. Other implementations for creating and maintaining a historical model or the like may be utilized. The present disclosure does not limit the implementation to any one methodology. The model having the programmer identifiers, associated source codes and places visited in the source codes may be stored in a database or the like or as a spreadsheet file. Any other methods may be employed in implementing and storing the model and the related data which may include, but is not limited to, programmers and places the programmers have visited and/or will be likely to visit in a source code or the like or other text or document).

A predictive model 204 includes future places that an expert given a goal such as debugging a bug in computer software or hardware would visit. The predictive model 208 may be built, for example, using a prediction module 210 or like instrument. Any behavioral prediction model or algorithm may be utilized to determine the future places.

An example of a predictive model 204 may be an information foraging model. For instance, Programmer Flow by Information Scent (PFIS), described by Joseph Lawrance, Rachel Bellamy, Margaret Burnett, Kyle Rector, "Using Information Scent to Model the Dynamic Foraging Behavior of Programmers in Maintenance Tasks", is a model and algorithm that predicts programmers' dynamic navigation behavior during program maintenance tasks. Information foraging theory uses the concept of scent to determine where someone will go when searching for information related to his or her goal. For example, programmers may be information foragers when debugging, because research has shown that when debugging, programmers create hypotheses and then search for information to verify (or refute) these hypotheses. Such hypotheses are linguistically related to the words in the bug reports. According to these assumptions, the bug report defines the programmer's goal and the scent they are seeking.

As with information foraging models that have been used to model web behavior, the PFIS model takes into account both the source code's topology (analogous to links on web pages) and its "scent." Using these concepts, PFIS predicts that programmers will likely visit the source code with the highest scent in relation to the bug report. The PFIS algorithm builds on the WUFIS (Web User Flow by Information Scent) algorithm, adapting and extending the approach used in WUFIS to model programmer navigation during software maintenance.

The PFIS algorithm predicts the classes and methods programmers will likely visit, and the paths they will likely take as they navigate through code in search of relevant places to fix bugs. PFIS is based upon the web user flow by information scent (WUFIS) algorithm, described in [Chi, E., Pirolli, P, Chen, K. and Pitkow, J, Using information scent to model user information needs and actions on the web. In Proc. CHI 2001, ACM Press (2001)], which combines information retrieval techniques with spreading activation. As WUFIS does for web path following, PFIS calculates the probability that a programmer will follow a particular "link" from one class or method in the source code to another, given a specific information need.

Consider the notion of links in the domain of program navigation. According to information foraging theory, the path an information forager will take is determined by the scent of proximal cues of a particular link in relation to their information need. In WUFIS, hyperlinks serve as the way information foragers navigate between pages, and thus the words in or near hyperlinks serve as proximal cues an information forager can use to choose among which links to follow in pursuit of a goal. In PFIS, a link is defined to be any means a programmer can use to navigate directly in one click or like to a specific place in source code, excluding scrolling between methods within a class or browsing among classes within a package. Thus, the definition of links takes into account the features of the programming environment. As in hyperlinks, links in programs have proximal cues associated with them: for example, a link from a method definition to a method invocation includes the name of the object of the invoked method, the name of the invoked method, and the names of the variables passed in as parameters to the invoked method.

For example, the Eclipse Package Explorer and Outline views allow programmers to navigate from packages to classes to fields and methods (one click each). Eclipse also allows programmers to open definitions and search for references to a method, variable, or a type in one click. Therefore, packages link to member classes, classes link to their fields and methods, methods link to the methods they invoke, and variables link to their type.

Due to the many one-click links, program navigation has two fundamental differences from web page navigation. First, what counts as a link is well-defined in a web site, whereas every identifier in a program may be (and is, in Eclipse) associated with a link to some definition or use. Second, source code has a much denser "link" topology than web pages, so there are many more ways to navigate to the same place. Because of such differences, to extend the ideas of WUFIS to program navigation requires defining the notion of links in source code, finding ways to process them, and defining the terms in and near a link that should be used and how to compute the scent of a link.

Another difference between PFIS and WUFIS is that PFIS is more "real world" than WUFIS. Some assumptions/controls that simplify the problem domain were made when developing WUFIS into the Bloodhound usability service, but they are not viable for the domain of program navigation. These simplifying assumptions/controls: (1) disallow the use of search, which is not a reasonable limitation to place on a programmer attempting to maintain software (e.g., programmers could choose to go anywhere once they had looked at the bug report); (2) have only one web page open at a time (in code navigation, programmers could keep class files open in tabbed panes); (3) give pages that did not have any links in them a link back to the starting page, which could not be done on real-world software without modifying it; and (4) remove the scent for links on the desired target document. This latter simplification was based on the assumption that people stopped searching when they reached the target and hence would not select any of the links on a target page. In code navigation, a target destination cannot be assumed because there is often no one "correct" target for a code maintenance task.

PFIS is summarized as follows:
Algorithm PFIS (Programmer Flow by Information Scent)
Given: Bug report, body of source code
Returns: A vector containing for each package, class, method, and variable, the probability that a programmer will visit that area of source code given the bug report.

Step 1. Determine link topology of source code and store them in matrix T.
Step 2. Determine set of proximal cues around each link.
Step 3. Determine proximal scent of each link to the bug report, and store the resulting similarity scores in matrix PS.
Step 4. Normalize matrix PS so that each column sums to 1.00 (i.e., generate a column-stochastic matrix).
Step 5. Define the starting place (class or method) for the spreading activation, and create an entry vector E with the starting location given a 1.
Step 6. Calculate the probability of programmers going from the starting location to other documents by multiplying the entry vector $E=A(1)$ by PS, to create an activation vector $A(2)$.
Step 7. Repeat step 6 to simulate programmers traversing through the link topology. The final activation vector $A(n)$, when normalized, contains for each location the expected probability that a programmer will visit that location given the bug report.

PFIS uses a link topology with nodes and links between them. In PFIS, the nodes are anything that is the destination of a link, e.g., method definitions, method invocations, variable definitions, etc. The link topology is described by a matrix, for example, an adjacency matrix. For step 1 of the PFIS algorithm, to create the link topology of source code, an Eclipse JDT plugin is created to traverse each class and method in each compilation unit, and the Java Universal Network/Graph Framework is used to construct the link topology (adjacency matrix) T, which gives us the beginning (i) and end points (j) for each link that a programmer can follow.

Steps 2 and 3 determine the proximal scent of each link relative to the bug report. Proximal scent is the information foraging term referring to "scent" near the link. For step 2 of PFIS, a special tokenizer is developed for words in cues, so that CamelCase identifiers (e.g., "NewsItem.getSafeXML-FeedURL( )") would be split into their constituent words ("news item get safe xml feed url"), and also a standard stemming algorithm is employed on the constituent words.

For step 3 of PFIS, the scent is determined by the similarity of words in the bug report to the text that labels the link and in close proximity to the link. Lucene, an open-source search engine API may be used to index the proximal cues (the text) associated with each link. Lucene uses TF-IDF, a technique commonly used in information retrieval to weight the importance of words in documents. The bug report may be treated as the query, and the proximal cues of each link as a document. Lucene determines the cosine similarity of each link in relation to the bug report to determine the scent of each link. These results are used as weights for the edges in matrix T, producing a proximal scent matrix PS.

In step 4, PFIS normalizes PS so that each column sums to 1, thus producing a column-stochastic matrix. In effect, each column contains the probability that a programmer will follow a link from one location to another. Thus, at the end of step 4, the proximal scent relative to the bug report has been calculated, reflecting the information foraging premise that links in the source with proximal cues close to the important words in the bug report will smell more strongly of the bug, and are thus more likely to be followed.

Steps 5, 6 and 7 simulate programmers navigating through the source code, following links based on scent. Spreading activation is an iterative algorithm used by HCI theories in which phenomena spread, and by information foraging theory in particular. It calculates how widely the spreading emanates. For PFIS, spreading activation calculates the likely spread of programmers to locations in source code, which can be interpreted as the expectation that a programmer trying to resolve a particular bug report will navigate to those locations in the program.

Spreading activation takes an activation vector A, a scent matrix PS, an entry vector E, and a scalar parameter α. The parameter α scales PS by the portion of users who do not follow a link. In the initial iteration, the activation vector equals the entry vector. Activation is updated (spread) in each iteration t as follows:

$$A(t):=\alpha PS*A(t-1)+E$$

In each iteration, activation from the entry vector is spread out to adjacent nodes, and activation present in any node is spread to neighboring nodes according to the scent, i.e., the edge weights in PS. In the final iteration, activation vector A represents the activation of each node (package, class, method, field) in our topology T. Normalizing A, A is interpreted as the probability of a hypothetical user visiting that node in T.

Referring to FIG. 2, a matching module 206 or like functionality matches the future places predicted for the give goal with the historical places in the historical model 202. One or more users who are likely to be best fit to accomplish the given goal, for example, to debug the software are identified by inference. That is, the users associated with the matched historical places are identified.

A user interface module 208 may output the identified users for example as recommended users for debugging a particular bug. A list of users may be presented in a prioritized manner as described above when describing 108 in FIG. 1.

The system and method of the present disclosure may be applied to many scenarios. For example, the predicted path of the present disclosure can be used as the basis for a tool that would advise someone working on a bug which code they should visit and in which order. The sets of predicted paths can be used as the basis for code visualizations that indicate for a given bug report, the classes, and/or methods and/or lines of code, an expert programmer is most likely to visit, and in which order. The system and method can further indicate for these predicted places: who has previously visited them, which places have been visited most frequently, and others. The system and method of the present disclosure can also add additional information, for example, derived from secondary sources, to the visualization about the people who have visited the code in the past such as what their role was, how many bugs they have resolved, and others. Furthermore, system and method of the present disclosure can indicate who has previously followed the same or overlapping paths.

Yet another application is code refactoring based on predicted navigation paths, and/or common navigation paths. Code refactoring includes structural changes as to how the source code is presented, for example, changing the order in which different methods and classes appear in the source code, changing linguistic terms such as names of code, methods, functions, variables, and others for clearer understanding. For example, based on the predicted path, an IDE could represent the program code or the like, so that each method or the like is arranged in the predicted order of navigation. Another example would be to have a user identify places in the code or the like that are related to a particular goal. Then based on a linguistic analysis of the goal alternative names for classes, methods and variables could be suggested that were more semantically related to the words in the goal.

The system and method of the present disclosure may be used also to predict who a good repairman might be for a particular bug. A good repairman would be someone who has previously navigated to the places related to that bug, and/or has previously followed similar navigation paths. Such a person would make a good repairman because that person is more likely to recall the code, and what it does (e.g., the functionality of the code), and is also likely to have considered other codes that may be dependent on the code being debugged.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
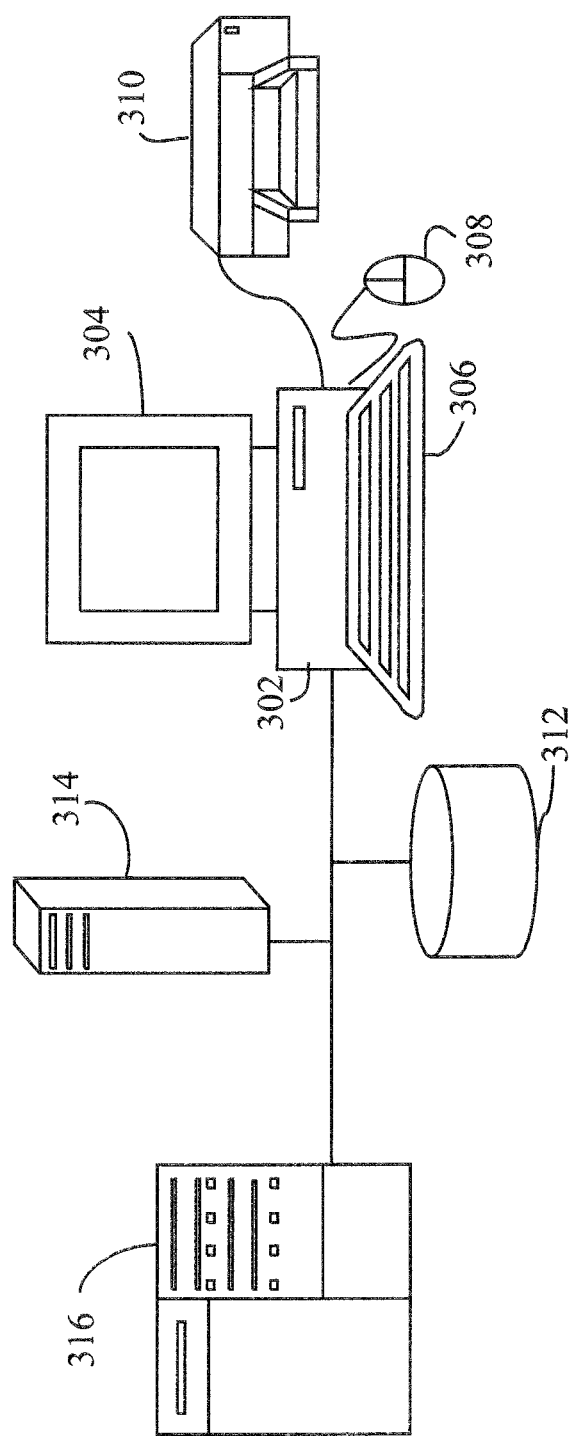
FIG. 3 illustrates an example of a computer system for carrying out systems and methodologies of the present disclosure.

Referring now to FIG. 3, the systems and methodologies of the present disclosure may be carried out or executed in a computer system that includes a processing unit 320, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 320 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 304 for presenting output displays and providing a display through which the user may input data and interact with the processing system, for instance, in cooperation with input devices such as the keyboard 306 and mouse device 308 or pointing device. The computer processing system may be also connected or coupled to one or more peripheral devices such as the printer 310, scanner (not shown), speaker, and any other devices, directly or via remote connections. The computer processing system may be connected or coupled to one or more other processing systems such as a server 310, other remote computer processing system 314, network storage devices 312, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 302, 314, 318), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of determining a prioritized list of one or more users related to a given goal, comprising:
   obtaining a set of places by a processor;
   predicting probability of one or more future places a hypothetical expert associated with a given goal is likely to visit to accomplish the given goal, wherein a predicted path comprising said one or more future places is obtained based on information scent similarity between a bug report associated with the given goal and said set of future places, the information scent similarity places, the information scent similarity of the said future places computed using proximal scent relative to the bug report;
   obtaining a history of one or more places users have visited, wherein one or more historical paths comprising said one or more places for each of the users is obtained;
   selecting one or more historical places from the history of one or more places that match the future places; and
   identifying one or more users, from said users, who previously traversed at least some of the future places in the predicted path, as a best fit user who can accomplish the given goal.

2. The method of claim 1, further including:
   outputting the identified one or more users associated with the determined one or more historical places.

3. The method of claim 1, wherein the given goal is described in a text document.

4. The method of claim 1, wherein the set of places is obtained by analyzing a collection of text with respect to the given goal, wherein the set of places comprises locations in the text.

5. The method of claim 4, wherein the collection of text includes source code, wherein the set of places comprises at least line numbers of the source code.

6. The method of claim 4, wherein the collection of text includes requirements.

7. The method of claim 4, wherein the collection of text includes documentation.

8. The method of claim 1, wherein the given goal is fixing a computer system bug.

9. The method of claim 1, wherein the given goal is described in a bug report.

10. The method of claim 1, wherein the history of one or more places users have visited includes secondary information associated with the users.

11. The method of claim 10, wherein the secondary information includes a role of the users.

12. The method of claim 1, wherein the step of identifying includes:
    identifying all users associated with the determined one or more historical places.

13. The method of claim 1, further including:
    determining frequency of historical visits for each of the determined future places.

14. The method of claim 1, further including:
    determining total number of historical visits for each of the determined future places.

15. The method of claim 1, further including:
    visualizing the one or more future places and the historical places.

16. The method of claim 15, wherein the visualizing further includes showing paths for the one or more future places and the historical places.

17. The method of claim 1, further including:
    establishing a recommended user interface for recommending one or more users to accomplish the given goal.

18. The method of claim 1, wherein the set of places comprises locations in a source code and the predicted probability is computed by simulating the hypothetical expert navigating through the source code following links based on scent.

19. A non-transitory program storage device readable by a machine, tangibly embodying a program of instructions executable by the machine to perform a method for determining a prioritized list of one or more users related to a given goal, comprising:
    obtaining a set of places;
    predicting probability of one or more future places a hypothetical expert associated with a given goal is likely to visit to accomplish the given goal, wherein a predicted path comprising said one or more future places is obtained based on information scent similarity between a bug report associated with the given goal and said set of future places, the information scent similarity of the said future places computed using proximal scent relative to the bug report;
    obtaining a history of one or more places users have visited, wherein one or more historical paths comprising said one or more places for each of the users is obtained;
    selecting one or more historical places from the history of one or more places that match the future places; and
    identifying one or more users, from said users, who previously traversed at least some of the future places in the predicted path, as a best fit user who can accomplish the given goal.

20. The program storage device of claim 19, further including:
    outputting the identified one or more users associated with the determined one or more historical places.

21. The program storage device of claim 19, wherein the given goal is described in a text document.

22. The program storage device of claim 19, wherein the set of places is obtained by analyzing a collection of text with respect to the given goal.

23. A system for determining a prioritized list of one or more users related to a given goal, comprising:
    a processor;
    historical model including a history of one or more places users have visited, wherein one or more historical paths comprising said one or more places for each of the users is obtained;
    a predictive model operable to predict probability of one or more future places a hypothetical expert associated with a given goal is likely to visit to accomplish the given goal, wherein a predicted path comprising said one or more future places is obtained based on information scent similarity between a bug report associated with the given goal and said set of future places, the information scent similarity of the said future places computed using proximal scent relative to the bug report;
    a matching module operable to execute on the processor and to select one or more historical places from the history of one or more places that match the future places, the matching module further operable to identify one or more users, from said users, who previously traversed at least some of the future places in the predicted path as a best fit user who can accomplish the given goal; and
a user interface module operable to present the identified one or more users.

* * * * *